United States Patent
Byerly

(10) Patent No.: US 7,296,714 B2
(45) Date of Patent: Nov. 20, 2007

(54) DEVICE FOR DISPENSING A HEATED LIQUID HAVING A FLEXIBLE HYDRAULIC SEAL

(75) Inventor: David J Byerly, Lawrenceville, GA (US)

(73) Assignee: Nordson Corporation, Westlake, OH (US)

( * ) Notice: Subject to any disclaimer, the term of this patent is extended or adjusted under 35 U.S.C. 154(b) by 228 days.

(21) Appl. No.: 10/904,662

(22) Filed: Nov. 22, 2004

(65) Prior Publication Data
US 2006/0108383 A1    May 25, 2006

(51) Int. Cl.
*B67D 3/00* (2006.01)
(52) U.S. Cl. ............... 222/504; 222/146.5; 222/389
(58) Field of Classification Search .......... 222/146.5, 222/389, 504, 146.2
See application file for complete search history.

(56) References Cited

U.S. PATENT DOCUMENTS

| | | | |
|---|---|---|---|
| 3,759,425 A | 9/1973 | Lee ............................. 222/309 |
| 3,982,724 A | 9/1976 | Citrin ........................... 251/7 |
| 4,126,321 A | 11/1978 | Harjar et al. | |
| 4,583,662 A | 4/1986 | Silverthorn et al. .......... 222/43 |
| 4,651,906 A | 3/1987 | Hoffmann et al. ......... 222/504 |
| 5,244,152 A | 9/1993 | Hofmann .................. 239/533.4 |
| 5,292,068 A | 3/1994 | Raterman et al. ............. 239/11 |
| 5,447,254 A | 9/1995 | Hoover et al. ................ 222/1 |
| 5,535,919 A | 7/1996 | Ganzer et al. ................ 222/1 |
| 5,598,974 A | 2/1997 | Lewis et al. ................ 239/135 |
| 5,645,224 A | 7/1997 | Koch ....................... 239/533.4 |
| 5,794,825 A | 8/1998 | Gordon et al. .............. 222/504 |
| 5,853,124 A | 12/1998 | Beck et al. ..................... 239/5 |
| 5,899,385 A | 5/1999 | Hofmann et al. ........... 239/124 |
| 5,957,343 A * | 9/1999 | Cavallaro ................... 222/504 |
| 6,056,155 A | 5/2000 | Byerly et al. ................. 222/1 |
| 6,253,957 B1 * | 7/2001 | Messerly et al. .............. 222/1 |

(Continued)

FOREIGN PATENT DOCUMENTS

DE    3153338 C2    6/1989

(Continued)

OTHER PUBLICATIONS

EFD, Piston Valve Systems for Precise Deposits of Viscous Fluids, Brochure, 2006, 2 pgs.

(Continued)

*Primary Examiner*—J. Casimer Jacyna
(74) *Attorney, Agent, or Firm*—Wood, Herron & Evans, LLP

(57) ABSTRACT

A device for dispensing a heated liquid, such as a hot melt adhesive, which includes a heated dispenser body having a liquid passage in communication with a liquid inlet and a liquid outlet. The dispenser body further includes a valve element having a circumferential groove therearound cooperating with a recessed portion of the dispenser body to define a cavity about the valve element. A flexible seal is situated within the cavity between the liquid passage containing the heated liquid and an upper area of the dispenser body. A first portion of the seal is configured to form a fluid tight seal within the recessed portion and a second portion is configured to form a fluid tight seal about the valve element during reciprocation thereof relative to the recessed portion, thereby preventing liquid from leaking out of the liquid passage past the flexible seal and into the upper area.

25 Claims, 6 Drawing Sheets

U.S. PATENT DOCUMENTS

| | | | |
|---|---|---|---|
| 6,334,554 B1 * | 1/2002 | Bolyard et al. | 222/389 |
| 6,799,702 B1 | 10/2004 | Mercer et al. | |
| 2005/0224513 A1 * | 10/2005 | Strong et al. | 222/1 |
| 2005/0236438 A1 | 10/2005 | Chastine et al. | |

FOREIGN PATENT DOCUMENTS

| | | |
|---|---|---|
| DE | 3812384 C2 | 10/1989 |
| DE | 4122594 A1 | 11/1992 |
| DE | 10046326 B4 | 4/2002 |

OTHER PUBLICATIONS

EFD, Compact Diaphragm Valve for Fine Flow Control, Brochure, 2006, 2 pgs.

* cited by examiner

DEVICE FOR DISPENSING A HEATED LIQUID HAVING A FLEXIBLE HYDRAULIC SEAL

FIELD OF THE INVENTION

The present invention pertains generally to devices for dispensing a heated liquid and, more particularly, to a device for dispensing a heated liquid having a flexible hydraulic seal.

BACKGROUND OF THE INVENTION

A typical dispensing device for supplying a heated liquid, such as a hot melt adhesive, generally includes a heated dispenser body constructed from a heat transferable metal, such as aluminum, brass, or stainless steel, and typically is coupled to a manifold, or other heater block, adapted to heat a liquid. The dispenser body includes a liquid inlet in fluid communication with the manifold to receive the heated liquid, and further includes a valve element that opens and closes a liquid outlet in communication with the inlet for dispensing discrete amounts of the heated liquid.

The valve element is usually operated by pressurized air to dispense the heated liquid. As such, an air passage or chamber typically is located in an upper area of the dispenser body, i.e. at an end opposite the liquid outlet. This air passage usually contains an actuating element, e.g. a piston, connected to the valve element and may further cooperate with a spring return mechanism. Under sufficient air pressure, the piston and valve element may be moved in a direction away from the liquid outlet to discharge liquid. When the air pressure on one side of the piston is relieved, the spring return mechanism will automatically return the valve element to a normally closed position. Air pressure may also be used to close the valve element. The spring return mechanism may be used to adjust valve stroke such as by varying its compression, thereby varying the amount of air pressure required to open the valve. Adjustment of the spring compression will also adjust the biasing force used to close the valve.

Notably, the dispensing devices related to the present invention generally situate at least one seal around the valve between the liquid passage and the upper area in an attempt to prevent heated liquid from entering the area. The seal usually is a standard O-ring, or spring-energized cup seal, tightly fit around the valve for axial movement therewith along an inner surface of the dispenser body. This seal arrangement, commonly referred to as a sliding-fit condition, can reduce the lifespan of the seal due to the reciprocating axial movement along the inner surface of the dispenser body. Also, costly, critical-surface machining on the surface of the valve element is required to provide the tight fit for the seal. Furthermore, the sliding-fit condition has a tendency to permit unfavorable leakage between the seal interface and the valve element. This leakage can reduce the performance of the dispensing device, for example, by decreasing the lifespan of the actuating element.

Accordingly, there is a need for an improved device for dispensing heated liquids, such as hot melt adhesives, which eliminates or reduces hydraulic seal leakage and critical valve surface machining thereby reducing costs and extending the life of the dispensing device.

SUMMARY OF THE INVENTION

The present invention provides for a device for dispensing a heated liquid having a flexible hydraulic seal. To this end, the device includes a heated dispenser body having a liquid inlet in fluid communication with a heated manifold to receive a heated liquid, a liquid passage in communication with the liquid inlet, and a liquid outlet in communication with the liquid passage. The dispenser body further includes a valve element having an outer surface with a circumferential groove therearound and is adapted to selectively allow and prevent flow of the heated liquid through the outlet from the liquid passage.

An inner surface of the dispenser body may include a stepped portion and further is provided with a plug situated about the valve element and adjacent the liquid passage. The stepped portion is spaced apart from the plug to define a recessed portion cooperating with the groove to define a cavity about the valve element. The plug preferably is threadably engaged with the inner surface of the dispenser body. In an alternate embodiment, the stepped portion and plug are switched such that the stepped portion is situated adjacent the liquid passage with the plug being spaced apart therefrom to define the recessed portion.

A flexible seal is situated within the cavity separating the liquid passage containing the heated liquid and an upper area of the dispenser body. The seal is a standard O-ring type seal composed of an elastomeric material, such as a fluoroelastomer, or may be a spring-energized cup seal. A first portion of the seal is configured to form a fluid-tight seal within the recessed portion and a second portion is configured to form a fluid-tight seal about the valve element during reciprocation thereof relative to the recessed portion. The seal is situated so that the second portion flexes about a central axis of the valve element during reciprocation while the first portion remains relatively stationary within the recessed portion. This seal arrangement prevents liquid from leaking out of the liquid passage past the flexible seal into the upper area and further helps extend the lifespan of the seal.

The features and various advantages of the present invention will become more readily apparent from the following detailed description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain one or more embodiments of the invention.

DETAILED DESCRIPTION

Figure 1:
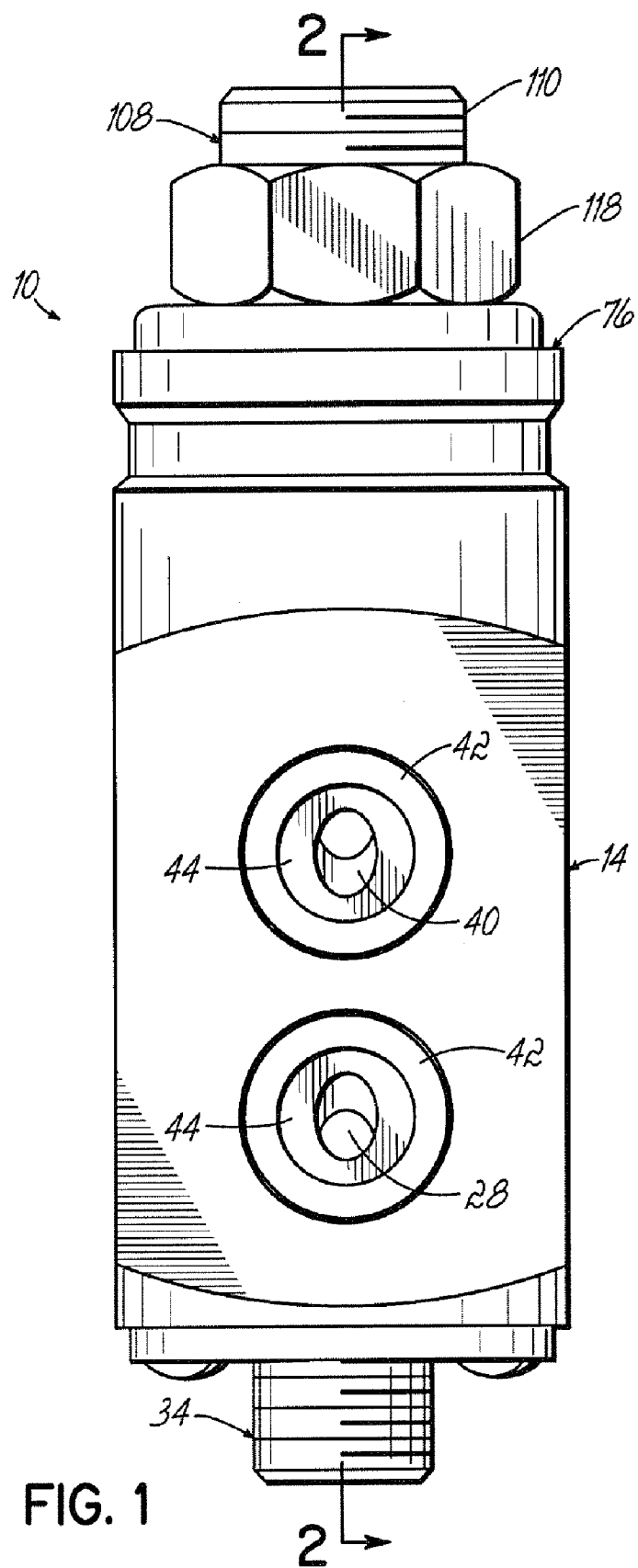
FIG. 1 is a side elevational view of a device for dispensing a heated liquid having a flexible hydraulic seal of the present invention.
Figure 2:
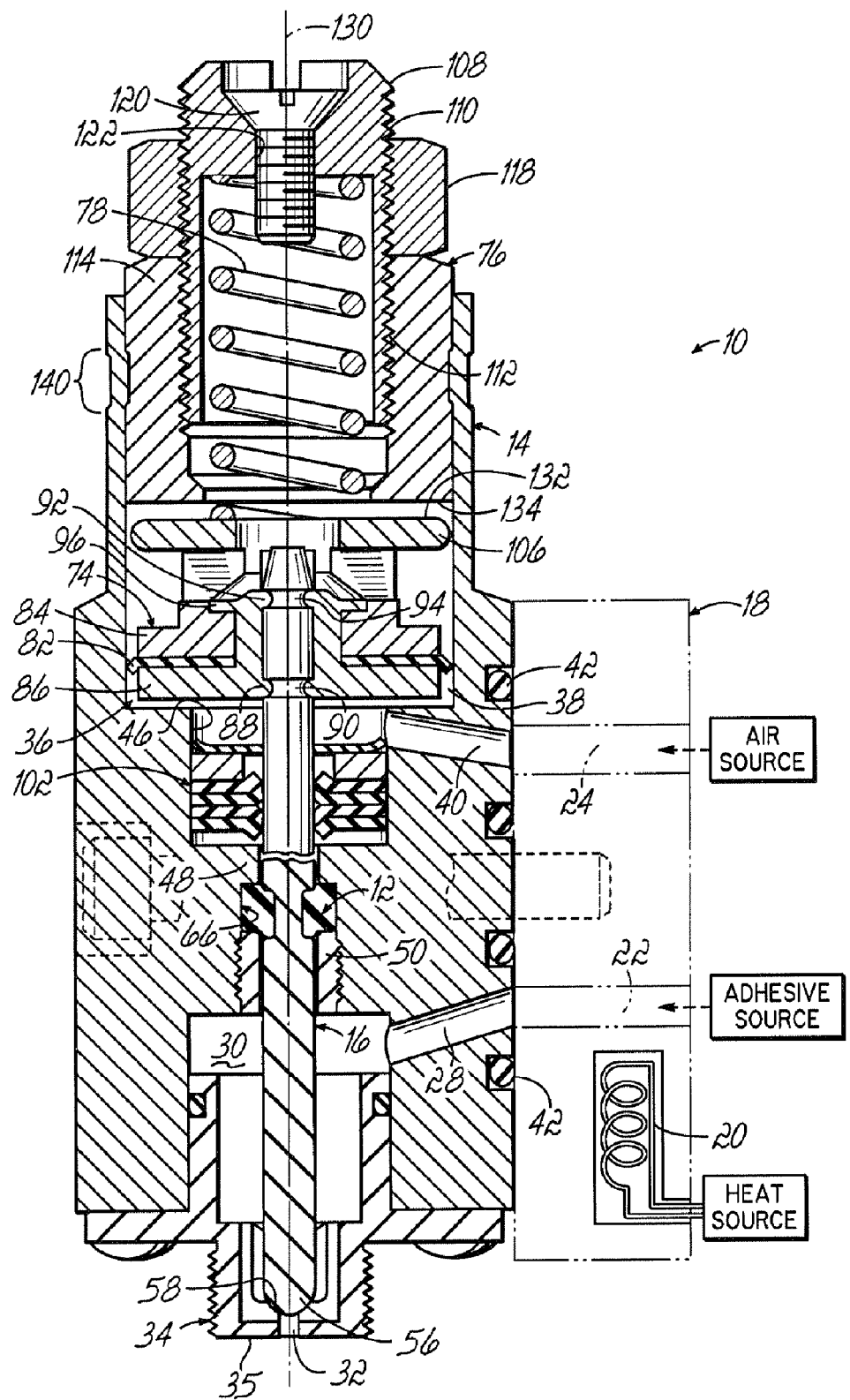
FIG. 2 is a sectional view taken along line 2-2 of the device of FIG. 1.

As shown in FIGS. 1 and 2, a device 10 for dispensing a heated liquid (not shown), such as a hot melt adhesive, having a flexible hydraulic seal 12 generally includes a dispenser body 14 having a valve element 16 adapted to be pneumatically driven for dispensing discrete amounts of the heated liquid. One alternative to the device 10 of FIG. 1 could be an electrically actuated dispenser device (not shown) instead of the pneumatically actuated dispenser device 10. A suitable pneumatically driven device 10 that may be modified to incorporate the flexible hydraulic seal 12 of the present invention is disclosed in U.S. Pat. No. 6,056,155 to Byerly et al., which is hereby fully incorporated herein by reference.

The dispenser body 14 is adapted to be heated and is constructed from a heat transferable, non-interactive metal, such as aluminum, brass, stainless steel, or the like. The dispenser body 14 further is coupled by means commonly known in the art, such as bolts or screws, to a manifold 18. The manifold 18 includes a chamber (not shown) for holding a liquid, a heating element 20 adapted to heat the liquid, a liquid outlet port 22 in communication with the chamber, and an air outlet port 24 for supplying pressurized air. The operation of the manifold 18 is well understood by one of ordinary skill in this field and delivers pressurized air and heated liquid to the dispenser body 14, respectively, via the air and liquid outlet ports 24, 22.

The dispenser body 14 further is provided with a liquid inlet 28 in fluid communication with the liquid outlet port 22 to receive the heated liquid, a liquid passage 30 in communication with the liquid inlet 28, and a liquid outlet 32 in communication with the liquid passage 30. More specifically, the liquid passage extends within the dispenser body 14 from the liquid inlet 28 into a nozzle 34 that is securely attached to the dispenser body 14 by means commonly known in the art, such as by bolts or screws. An end 35 of the nozzle is provided with the liquid outlet 32 such that heated liquid flows from the liquid inlet 28, to the liquid passage, and out the device 10 through the liquid outlet 32.

The dispenser body 14 also includes an upper area 36 provided with an air passage 38 in communication with air inlet 40 that receives and directs pressurized air from the air outlet port 24 to the air passage 38. Air passage 38 is used to operate the valve element 16 as will be discussed below. O-rings 42 are respectively disposed about inlets 28, 40 to seal these connections. Air and liquid inlets 28, 40 respectively have annular lips 44 that hold O-rings 42 in place. The O-rings 42 provide a face seal with manifold 18.

Figure 2A:
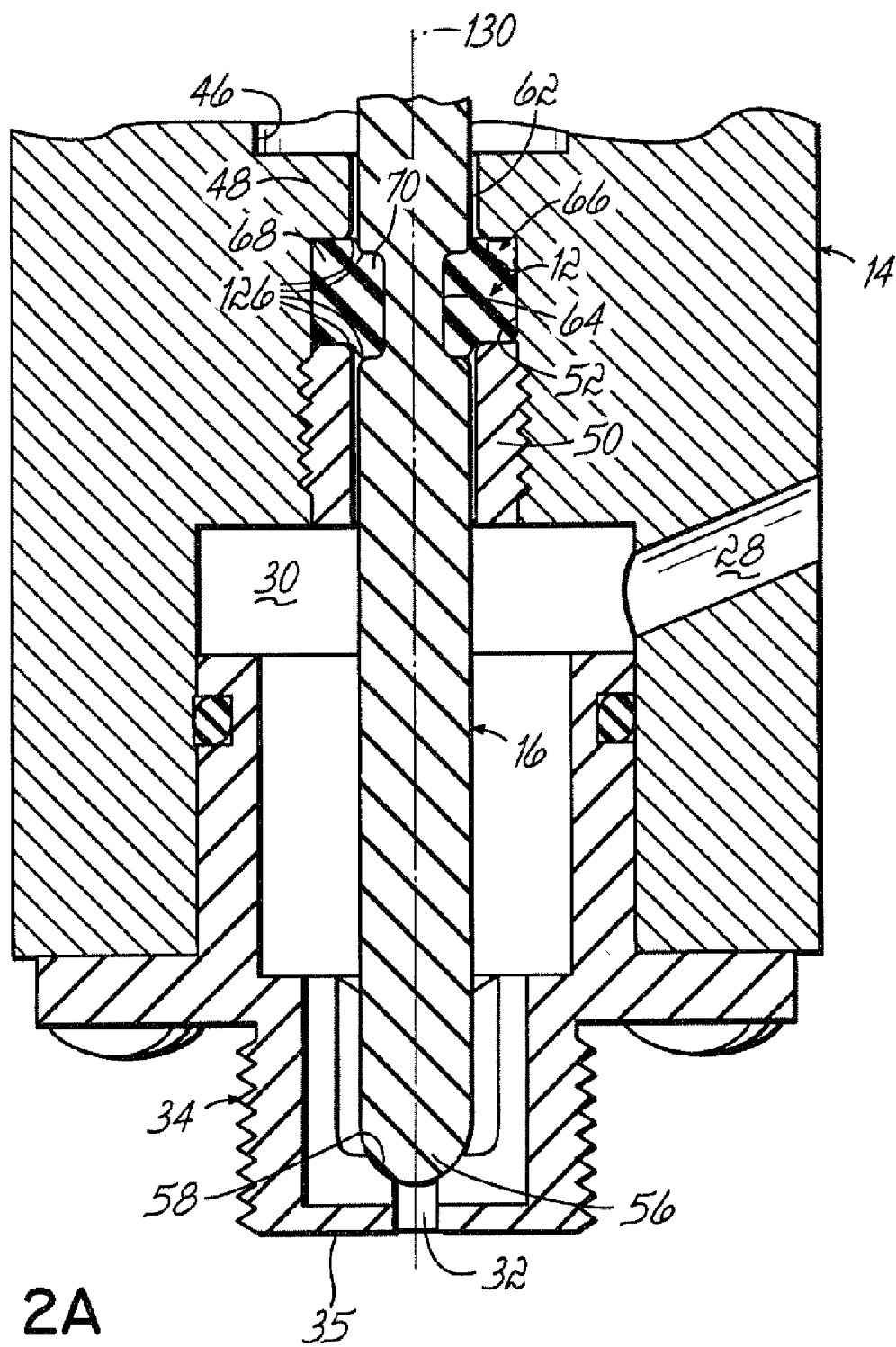
FIG. 2A is an enlarged cut-away sectional view of the dispenser body of FIG. 2 showing the seal in a flexed position when the valve element is in a fully closed position.
Figure 2B:
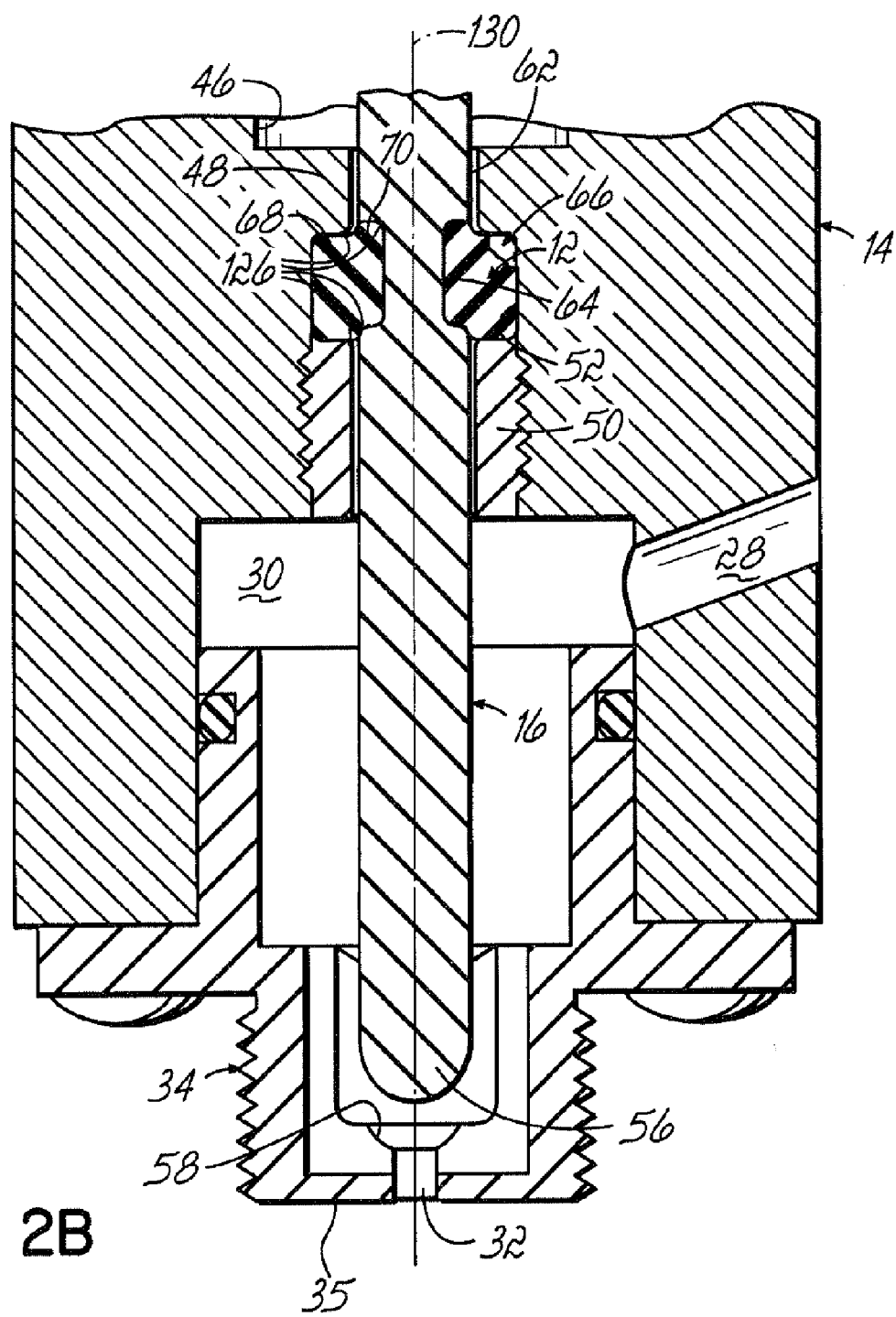
FIG. 2B is an enlarged cut-away sectional view of the dispenser body of FIG. 2 showing the seal in a flexed position when the valve element is in a fully open position.

As best shown in FIGS. 2A and 2B, the dispenser body 14 further includes an inner surface 46 having a stepped portion 48 and a plug 50 releasably and threadably engaged therewith adjacent the liquid passage 30. The stepped portion 48 is provided spaced apart from the plug 50 to define a recessed portion 52.

Figure 3:
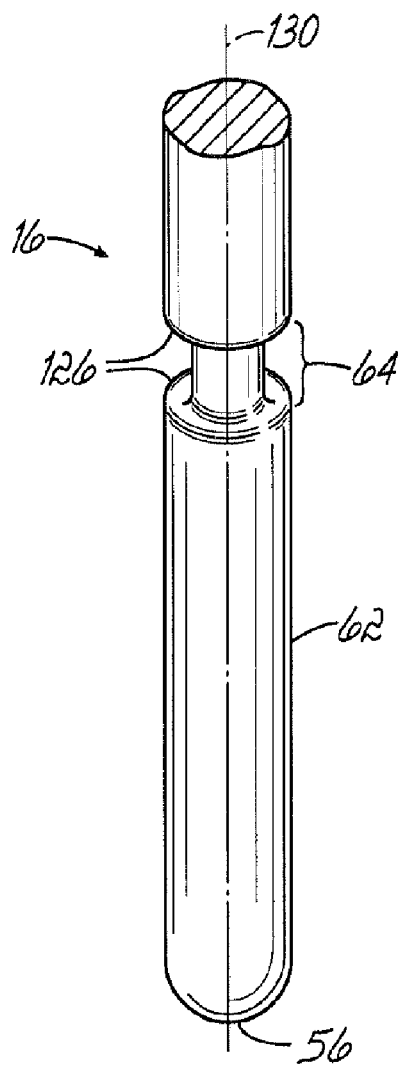
FIG. 3 is a partial perspective view of the valve element of FIG. 2.

As further shown in FIG. 2, the valve element 16 is situated substantially centrally within the dispenser body 14 and is adapted to selectively allow and prevent flow of the heated liquid from the liquid passage 30 through the liquid outlet 32. More specifically, the valve element 16 has a valve tip 56 configured to engage a valve seat 58 such that when the valve tip 56 is engaged therewith, no pressurized fluid can travel from the liquid passage 30 through the liquid outlet 32 of the nozzle 34, i.e., fluid remains within the liquid passage 30. In the alternative, when the valve element 16 is disengaged from the valve seat 58, then pressurized fluid is dispensed through the outlet 32. As best shown in FIGS. 2A-2B and 3, the valve element 16 also includes an outer surface 62 having a circumferential groove 64 therearound cooperating with the recessed portion 52 to define a cavity 66 about the valve element 16.

With further reference to FIGS. 2 and 2A-2B, the flexible seal 12 is situated within the cavity 66 between the liquid passage 30 and the upper area 36 of the dispenser body 14. A first portion 68 of the seal 12 is configured to form a fluid-tight seal within the recessed portion 52 and a second portion 70 is configured to form a fluid-tight seal about the valve element 16 during reciprocation thereof relative to the recessed portion 52. This seal arrangement prevents liquid from leaking out of the liquid passage 30 past the flexible seal 12 and into the upper area 36. The groove 64 and recessed portion 52 may be provided with rounded edges 126 to help maintain the integrity of the seal 12 during reciprocation.

Figure 4:
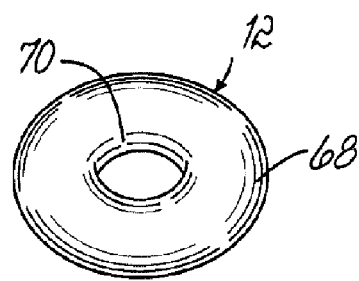
FIG. 4 is a perspective view of an embodiment of the flexible seal of the present invention.

As best shown in FIG. 4, the seal 12 is a standard O-ring type seal but can be other seal types, such as a spring-energized cup seal, and the like, and can include any variety of shapes. The seal 12 is composed of an elastomeric material, such as a fluorelastomer, and more exemplary, a fluorocarbon. The seal 12 is adapted for high temperatures and can sustain temperatures of at least about 400° F. to 500° F. The size of the seal 12 advantageously is equal to or slightly larger than that of the cavity 66 so that the seal 12 is compressed therein to provide for a tight seal. A preferred seal 12 is distributed by Alltek Seal and Packing of Jacksonville, Fla. and identified as Model No. 2-102 V3819-75. Another preferred seal 12, also distributed by Alltek Seal and Packing, is Model No. 2-102 FF500-75. In addition to being stable at high temperatures, both preferred seals have high tear resistance and low compression set at high temperatures.

Returning again to FIG. 2, the upper area 36 further includes actuating element 74, i.e. a piston, cooperating with the valve element 16 and includes spring return mechanism 76 positioned to urge the piston 74 and, thus, the valve element 16 downward. Movement of the piston 74, as further described below, is sufficient to overcome the force of spring 78 of the spring return mechanism 76 and move the valve element 16 upward to dispense heated liquid through the outlet 32.

The piston 74 is provided with a glass impregnated PTFE disc 82 (sold as Rulon type AR by Furon Company) sandwiched between two rigid metal discs 84 and 86 that may be crimped or otherwise secured together. Disc 86 preferably is crimped into rigid engagement with valve element 16 by deforming a lower annular portion 88 thereof into a circumferential groove 90 contained in the valve element 16. Likewise, an upper annular crimped portion 92 is deformed into a circumferential groove 94 in valve element 16. Finally, the upper portion 92 of disc 84 is also deformed outwardly, as shown by crimped portion 96, into firm engagement with disc 84 to hold the piston 74 together. As indicated above, pressurized air may be introduced into air passage 38 to move the piston 74 and valve element 16 away from valve seat 58 during a liquid dispensing operation.

The upper area 36 of the dispenser body 14 further is provided with a seal assembly 102 disposed about the valve element 16 between the air passage 38 and liquid passage 30 to further seal these passages 38, 30 from one another. Accordingly, the seal assembly 102 generally retains pressurized air within air passage 38 during operation of the device 10.

With continued reference to FIG. 2, a pivoting force transfer element 106 is disposed between the spring 78 and valve element 16 to transfer the spring force to the valve element 16 and maintain valve element 16 in a normally closed position against valve seat 58. A load screw 108 receives spring 78 and includes external threads 110 that engage internal threads 112 of a sleeve 114 secured to the dispenser body 14 in a manner to be described. Preferably, load screw 108 is formed of stainless steel and sleeve 114 is formed of brass. A lock nut 118 is threaded onto the outside of load screw 108 for allowing a spring adjustment to be locked in place. A machine screw 120 is preferably used to close a hole 122 within load screw 108. Hole 122 may be used to insert a probe into device 10, such as to determine whether valve element 16 is operating correctly.

To assemble the dispenser body 14 and valve element 16, the valve element 16 generally may be inserted into the dispenser body 14 from above and centrally positioned therein. Then, the seal 12 is placed around the valve tip 56 from below the dispenser body 14 and slid along the valve element 16 until the seal 12 is securely positioned within the groove 64. The plug 50 then is threadably engaged with the inner surface 46 of the dispenser body 14 around the valve element 16 to wedge the seal 12 between the stepped portion 48 and plug 50 so that at least the first and second portions 68, 70 of the seal 12, respectively, seal within the recessed portion 52 and about the valve element 16. The plug 50 and stepped portion 48 accordingly define the recessed portion 52 that cooperates with the groove 64 to define the seal cavity 66. The spring return mechanism 76 and nozzle 34 then further may be installed and adjusted (as needed).

Figure 5:
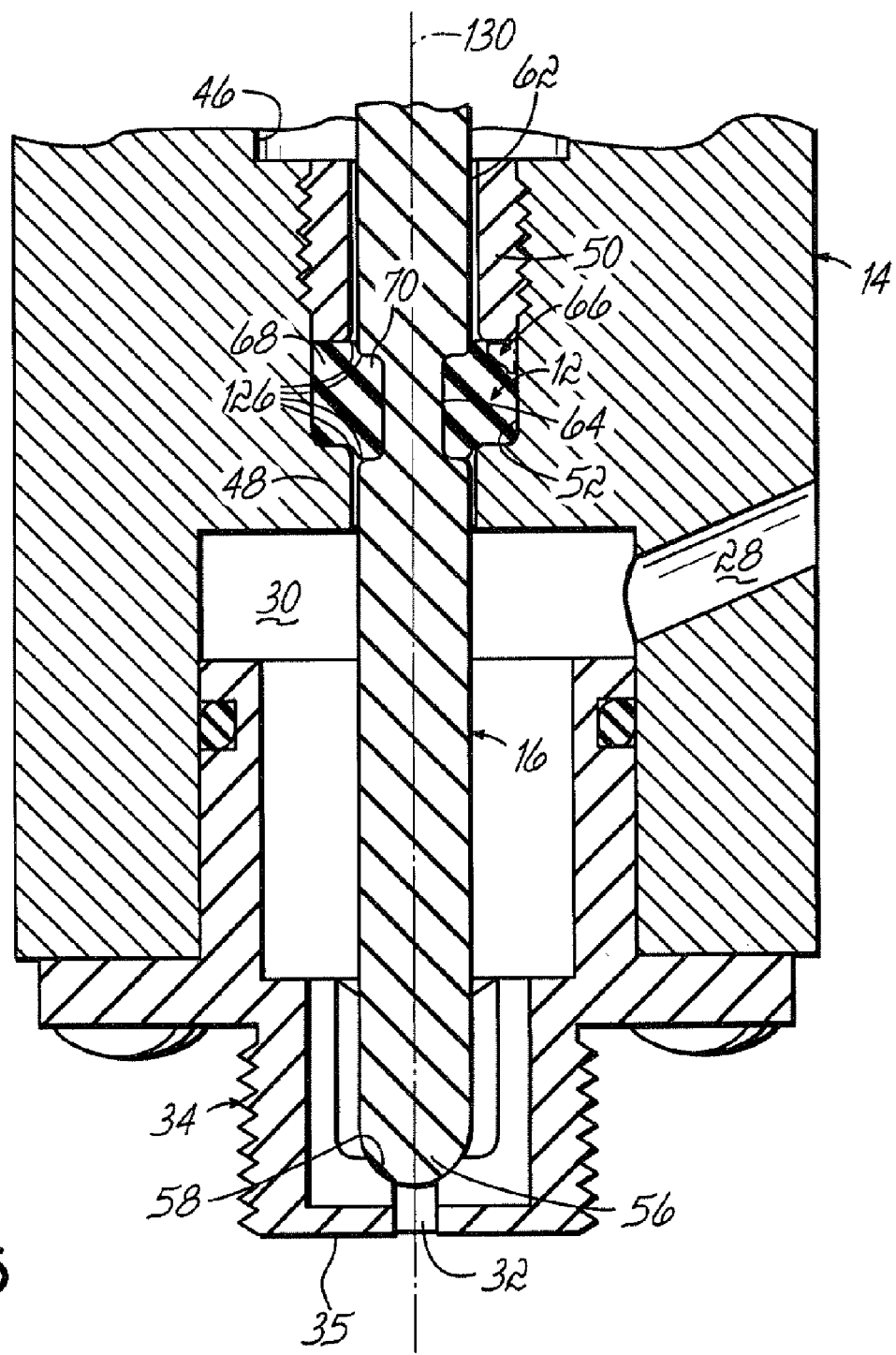
FIG. 5 is an enlarged cut-away sectional view of another embodiment of the device for dispensing a heated liquid having the flexible hydraulic seal of the present invention.

In an alternate embodiment, as shown in FIG. 5, the stepped portion 48 and plug 50 are switched such that the stepped portion 48 is situated adjacent the liquid passage 30 with the plug 50 being spaced apart therefrom to define the recessed portion 52. To assemble this embodiment, the plug 50 first may be provided around the valve element 16 then the seal 12 placed around and slid along the valve element 16 from the bottom until the seal 12 is securely positioned within the groove 64. The valve element 16 is inserted into the dispenser body 14 from above and centrally positioned therein so that the seal 12 rests against the stepped portion 48. The plug 50 then is threadably engaged with the inner surface 46 of the dispenser body 14 to wedge the seal 12 between the stepped portion 48 and plug 50 so that at least the first and second portions 68, 70 of the seal 12, respectively, seal within the recessed portion 52 and about the valve element 16. It should be understood that other assembly methods may be equally suitable for assembling the dispenser body 14 having the flexible seal 12.

As further shown in FIGS. 2 and 2A, the valve element 16, is initially situated in a fully closed positioned, i.e. the valve tip 56 meets the valve seat 58, such that the second portion 70 of the seal 12 is flexed about a central axis 130 of the valve element 16 while the first portion 68 remains fixedly secured within the recessed portion 52. Reciprocal movement of the valve element 16 with seal 12, from this fully closed position, is described further below.

During operation of the device 10, liquid is introduced under pressure into liquid inlet 28 such that liquid passage 30 is filled. Sufficient pressurized air is delivered to air passage 38 allowing the piston 74 to carry valve element 16 away from the valve seat 58, thereby forcing transfer element 106 in a direction toward sleeve 114 until surface 132 contacts surface 134. Pressurized liquid contained in liquid passage 30 will then flow through liquid outlet 32. Notably, when the valve element 16 moves upward from the fully closed position to a fully open position, as further shown in FIG. 2B, the second portion 70 of the seal 12 similarly flexes, in a reverse direction, about the central axis 130 of the valve element 16 while the first portion 68, again, remains fixedly secured within the recessed portion 52.

When the pressurized air directed through air outlet port 24 is turned off or sufficiently reduced, spring 78 will force transfer element 106 to push valve element 16 so that the valve tip 56 rests against valve seat 58, as again shown in FIGS. 2 and 2A, thus closing the liquid outlet 32. It should be understood that there are other equally suitable ways to provide for movement of the valve element 16. Other exemplary designs of the dispenser body 14 providing for such movement of the valve element 16 are disclosed in U.S. Pat. No. 6,056,155 to Byerly et al., which is hereby fully incorporated herein by reference.

The valve stroke, i.e. the amount of movement of the valve element 16 from a fully closed to a fully opened position, plays a key role in determining the amount of flexing of the seal 12. This movement, or total reciprocation of the valve element 16, for example, is no greater than about 0.016 inches, i.e. the second portion 70 of the seal 12 flexes no greater than about 0.008 inches about the central axis 130 in either direction. It is understood that other stroke lengths and dimensional parameters may be used depending on the application requirements and/or the desired flow rate. The stroke length may be easily and permanently set by moving valve element 16 against valve seat 58 and sleeve 114 against force transfer element 106 and then allowing sleeve 114 to back out under the force of spring 78 until reaching the desired stroke length. Then, sleeve 114 and body 14 are crimped together at crimped area 140 to set stroke length. In addition, the groove 64 and recessed portion 52 advantageously are provided with rounded edges 126 to help maintain the integrity of the seal 12 during reciprocation.

Accordingly, during reciprocation of the valve element 16 relative the recessed portion 52, the first and second portions 68, 70 of the seal 12, respectively, maintain fluid tight seals within the recessed portion 52 and about the valve element 16, thereby preventing liquid from leaking out of the liquid passage 30 past the flexible seal 12 and into the upper area 36.

In addition, it should be understood by one of ordinary skill that any number of alternative dispenser bodies 14 may be used herein. For example, dispenser bodies 14 may include integrally formed heater blocks and/or be integrally formed with a manifold, or other similar assembly. In addition, the term "valve element" is used herein in a generic sense and is intended to encompass a wide range of movable members having a variety of shapes and contours.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

What is claimed is:

1. A device for dispensing a heated liquid, comprising:
  a dispenser body including a liquid inlet configured to receive the heated liquid, a liquid passage in communication with said liquid inlet, an outlet in communication with said liquid passage to dispense the heated liquid, and a valve element including an outer surface and a circumferential groove in said outer surface of and around said valve element, said dispenser body further including an inner surface defining a recessed portion cooperating with said groove to define a cavity about said valve element, said valve element adapted to move relative to said recessed portion to selectively allow and prevent flow of the heated liquid through said outlet from said liquid passage;

an actuating element operatively coupled to said valve element to control dispensing of the heated liquid through said outlet; and a flexible seal situated within said cavity defined by said recessed portion cooperating with said groove and spaced from said actuating element, a first portion of said seal being configured to form a fluid tight seal within said recessed portion and a second portion being configured to form a fluid tight seal within said circumferential groove about said valve element during reciprocation of said valve element relative to said recessed portion thereby preventing liquid from leaking out of said liquid passage past said flexible seal.

2. The device of claim 1 wherein said groove and recessed portion include rounded edges to maintain seal integrity during reciprocation of said valve element.

3. The device of claim 1 wherein said seal is formed from an elastomer.

4. The device of claim 3 wherein said elastomer includes a fluoroelastomer.

5. The device of claim 1 wherein said inner surface includes a plug situated about said valve element and a stepped portion adjacent said liquid passage, said plug being spaced apart from said stepped portion to define said recessed portion.

6. The device of claim 1 wherein said inner surface includes a stepped portion and a plug situated about said valve element and adjacent said liquid passage, said stepped portion being spaced apart from said plug to define said recessed portion.

7. The device of claim 1 wherein the actuating element is pneumatically operable to control dispensing of the heated liquid through said outlet, said seal being situated between said liquid passage and said actuating element.

8. The device of claim 1 wherein the actuating element is electrically operable to control dispensing of the heated liquid through said outlet, said seal being situated between said liquid passage and said actuating element.

9. The device of claim 1 wherein said second portion of said seal flexes along a central axis thereof during reciprocation of said valve element relative to said recessed portion.

10. A device for dispensing a heated liquid, comprising:
a dispenser body including a liquid inlet configured to receive the heated liquid, a liquid passage in communication with said liquid inlet, an outlet in communication with said liquid passage to dispense the heated liquid, and a valve element including an outer surface with a circumferential groove therearound, said dispenser body further including an inner surface having a plug situated about said valve element and a stepped portion adjacent said liquid passage, said plug being spaced apart from said stepped portion to define a recessed portion, said recessed portion cooperating with said groove to define a cavity about said valve element, said valve element adapted to move relative to said recessed portion to selectively allow and prevent flow of the heated liquid through said outlet from said liquid passage;

an actuating element operatively coupled to said valve element to control dispensing of the heated liquid through said outlet; and a flexible seal situated within said cavity between said actuating element and said liquid passage, a first portion of said seal being configured to form a fluid tight seal within said recessed portion and a second portion being configured to form a fluid tight seal about said valve element during reciprocation of said valve element relative to said recessed portion thereby preventing liquid from leaking out of said liquid passage past said flexible seal.

11. The device of claim 10 wherein said groove and said recessed portion include rounded edges to maintain seal integrity.

12. The device of claim 10 wherein said seal is formed from an elastomer.

13. The device of claim 12 wherein said elastomer includes a fluoroelastomer.

14. The device of claim 10 wherein said actuating element includes a piston operatively coupled to said valve element, said piston being pneumatically operable to control dispensing of the heated liquid through said outlet.

15. The device of claim 10 wherein said actuating element includes a piston operatively coupled to said valve element, said piston being electrically operable to control dispensing of the heated liquid through said outlet.

16. The device of claim 10 wherein said plug is threadably engaged with said inner surface.

17. The device of claim 10 wherein said second portion of said seal flexes along a central axis thereof during reciprocation of said valve element relative to said recessed portion.

18. A device for dispensing a heated liquid, comprising:
a dispenser body including a liquid inlet configured to receive the heated liquid, a liquid passage in communication with said liquid inlet, an outlet in communication with said liquid passage to dispense the heated liquid, and a valve element including an outer surface with a circumferential groove therearound, said dispenser body further including an inner surface having a stepped portion and a plug situated about said valve element and adjacent said liquid passage, said stepped portion being spaced apart from said plug to define a recessed portion, said recessed portion cooperating with said groove to define a cavity about said valve element, said valve element adapted to move relative to said recessed portion to selectively allow and prevent flow of the heated liquid through said outlet from said liquid passage;

an actuating element operatively coupled to said valve element to control dispensing of the heated liquid through said outlet; and a flexible seal situated within said cavity between said actuating element and said liquid passage, a first portion of said seal being configured to form a fluid tight seal within said recessed portion and a second portion being configured to form a fluid tight seal about said valve element during reciprocation of said valve element relative to said recessed portion thereby preventing liquid from leaking out of said liquid passage past said flexible seal.

19. The device of claim 18 wherein said groove and said recessed portion include rounded edges to maintain seal integrity.

20. The device of claim 18 wherein said seal is formed from an elastomer.

21. The device of claim 20 wherein said elastomer includes a fluoroelastomer.

22. The device of claim 18 wherein said actuating element includes a piston operatively coupled to said valve element, said piston being pneumatically operable to control dispensing of the heated liquid through said outlet.

23. The device of claim 18 wherein said actuating element includes a piston operatively coupled to said valve element, said piston being electrically operable to control dispensing of the heated liquid through said outlet.

24. The device of claim 18 wherein said plug is threadably engaged with said inner surface.

25. The device of claim 18 wherein said second portion of said seal flexes along a central axis thereof during reciprocation of said valve element relative to said recessed portion.

* * * * *